(12) United States Patent
Suzuki (10) Patent No.: US 11,548,073 B2
(45) Date of Patent: Jan. 10, 2023

(54) CUTTING INSERT AND CUTTING TOOL

(71) Applicant: TUNGALOY CORPORATION, Fukushima (JP)

(72) Inventor: Yuusuke Suzuki, Iwaki (JP)

(73) Assignee: TUNGALOY CORPORATION, Fukushima (JP)

( * ) Notice: Subject to any disclaimer, the term of this patent is extended or adjusted under 35 U.S.C. 154(b) by 165 days.

(21) Appl. No.: 16/728,850

(22) Filed: Dec. 27, 2019

(65) Prior Publication Data

US 2020/0206824 A1 Jul. 2, 2020

(30) Foreign Application Priority Data

Dec. 28, 2018 (JP) .............................. JP2018-248014

(51) Int. Cl.
*B23B 27/04* (2006.01)

(52) U.S. Cl.
CPC .................................. *B23B 27/045* (2013.01)

(58) Field of Classification Search
CPC ... B23B 27/04; B23B 27/045; B23B 27/1603; B23B 27/1611; B23B 27/1607; B23B 29/043; B23B 2220/12; B23B 2200/205; B23B 2200/204; B23B 2200/245; B23C 2200/205; B23C 2200/206; B23C 2220/36; B23C 3/28

See application file for complete search history.

(56) References Cited

U.S. PATENT DOCUMENTS 4,969,779 A  11/1990 Barten
5,827,017 A  10/1998 Tagstrom et al.

FOREIGN PATENT DOCUMENTS

| JP | H02-284805 A | 11/1990 | |
|---|---|---|---|
| JP | H03-120304 U | 12/1991 | |
| JP | H07-501753 A | 2/1995 | |
| JP | H09174308 A | 7/1997 | |
| WO | WO-9311898 A1 * | 6/1993 | ........... B23B 27/141 |

* cited by examiner

*Primary Examiner* — Alan Snyder
(74) *Attorney, Agent, or Firm* — Studebaker & Brackett PC (57) ABSTRACT

A cutting insert exhibits superior chip control during grooving and cross feeding. Embodiments include a cutting insert having an upper face, a front face forming an intersecting ridgeline with the upper face, side faces connected to the front face forming intersecting ridgelines with the upper face, a front face cutting edge on the intersecting ridgeline between the upper face and the front face, and side cutting edges on the intersecting ridgelines between the upper face and the side faces. The upper face includes a first portion and an undulating portion on which peaks and troughs are formed continuously in a direction heading away from the front face cutting edge, the undulating portion provided on both lateral direction sides of the first portion. The undulating portion is configured such that the side cutting edges, when seen from the side, each have a continuous undulating shape from the front face cutting edge.

9 Claims, 13 Drawing Sheets

CUTTING INSERT AND CUTTING TOOL

BACKGROUND

Field

The present invention relates to a cutting insert and a cutting tool.

Description of Related Art

A cutting insert for performing grooving and cross feeding is available (see Patent Publication JP-A No. H09-174308). The cutting insert has a substantially rectangular parallelepiped-shaped main body, and includes an upper face (a rake face) having a chip breaker, a front face that forms an intersecting ridgeline with the upper face, and side faces that are connected to the respective sides of the front face and form intersecting ridgelines with the upper face. The cutting insert further includes a front face cutting edge provided on the intersecting ridgeline between the upper face and the front face and used for grooving, and side cutting edges provided on the intersecting ridgelines between the upper face and the respective side faces and used for cross feeding.

During cutting, the front face cutting edge is caused to directly oppose a rotating work material in an orthogonal direction to a rotary axis of the work material, the cutting insert is fed to the work material side, and grooving is performed using the front face cutting edge. Next, from a state in which the cutting insert is inserted into the work material so as to form a groove therein, the cutting insert is fed in the rotary axis direction, whereby cross feeding is performed using the side cutting edge.

SUMMARY

In a cutting insert such as that described above, however, chip control is performed by the chip breaker during grooving, but the shape and so on of the chips are not sufficiently controlled during cross feeding following grooving, and therefore chip control is poor. When chip control is poor, chips may become lodged between the cutting insert and the work material, for example, thereby affecting the machining precision and the work efficiency, which is undesirable.

The present invention has been designed in consideration of this problem, and an object thereof is to provide a cutting insert and a cutting tool that exhibit superior chip control during both grooving and cross feeding.

A cutting insert according to one aspect of the present invention has a substantially rectangular parallelepiped-shaped tip end portion, the tip end portion including an upper face, a front face that is positioned on a longitudinal direction end face of the tip end portion and forms an intersecting ridgeline with the upper face, a side face that is connected to the front face and forms an intersecting ridgeline with the upper face, a front face cutting edge provided on the intersecting ridgeline between the upper face and the front face, and a side cutting edge provided on the intersecting ridgeline between the upper face and the side face, wherein the upper face includes a projection-shaped or groove-shaped first upper face portion, and an undulating upper face portion on which peaks and troughs are formed continuously in a direction heading away from the front face cutting edge, the undulating upper face portion being provided on at least one lateral direction side of the first upper face portion, and the undulating upper face portion is configured such that the side cutting edge, when seen from the side, has a continuous undulating shape from the front face cutting edge.

According to this aspect, the upper face of the cutting insert includes the undulating upper face portion on which peaks and troughs are formed continuously in a direction heading away from the front face cutting edge, and the undulating upper face portion is configured such that the side cutting edge has a continuous undulating shape from the front face cutting edge. Thus, the shape of chips released during grooving is controlled by the first upper face portion, and the shape of chips released during cross feeding is controlled by the undulating upper face portion. As a result, the undulating upper face portion can improve chip control during cross feeding while the first upper face portion improves chip control during grooving. Hence, a cutting insert that exhibits superior chip control during both grooving and cross feeding can be realized.

In the aspect described above, the undulating upper face portion may be configured such that at least some of the peaks and troughs of the undulating shape advance gradually in a direction heading away from the front face cutting edge from the side cutting edge toward the first upper face portion.

In the aspect described above, the undulating upper face portion may be configured such that the undulating shape is at least partially connected to a side face portion of the first upper face portion.

In the aspect described above, the undulating shape may include at least a first peak, a first trough, a second peak, and a second trough in that order in the direction heading away from the front face cutting edge, using the front face cutting edge as a start point, the first peak may be formed along the front face cutting edge, and the second peak may be connected to the side face portion further in the direction heading away from the front face cutting edge than a front face portion on the front face side of the first upper face portion.

In the aspect described above, the undulating upper face portion may be configured such that the undulating shape of the side cutting edge, when seen from the side, includes a trough that decreases in height from the front face cutting edge, using the front face cutting edge as a start point.

In the aspect described above, a distance from a start point of the side cutting edge to a lowermost portion of the trough when seen from the side may be set at not more than 3 mm.

In the aspect described above, the undulating upper face portion may be configured such that an amplitude of the undulating shape of the side cutting edge gradually increases away from the front face cutting edge.

In the aspect described above, a curvature radius of a curved portion of the undulating shape of the side cutting edge, when seen from the side, may be set at not more than 8 mm.

In the aspect described above, the front face cutting edge may have a rectilinear shape when seen from above.

In the aspect described above, the first upper face portion may be formed as a ridge extending in a front face direction toward the front face.

In the aspect described above, the undulating upper face portion may be provided on both lateral direction sides of the first upper face portion.

A cutting tool according to another aspect of the present invention includes the cutting insert described above.

DETAILED DESCRIPTION

A preferred embodiment of the present invention will be described below with reference to the figures. Note that identical elements have been assigned identical reference numerals, and duplicate description thereof has been omitted. Further, positional relationships such as up, down, left, right, and so on are assumed to be based on the positional relationships shown in the figures, unless specified otherwise. Moreover, dimensional ratios in the figures are not limited to the illustrated ratios. Furthermore, the embodiment to be described below is an example used to illustrate the present invention, and the present invention is not limited to this embodiment.

Figure 1:
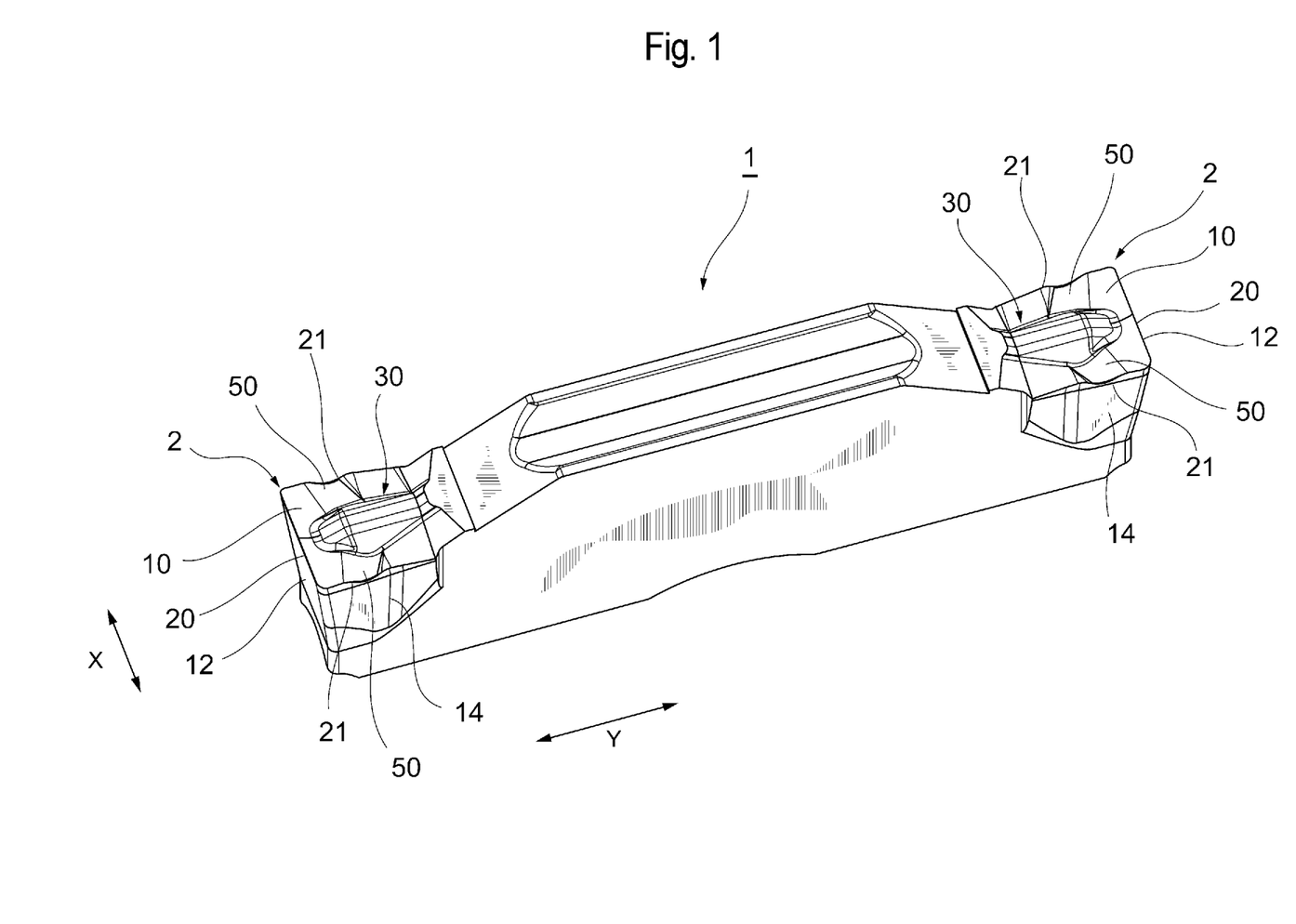
FIG. 1 is a perspective view of a cutting insert.
Figure 2:
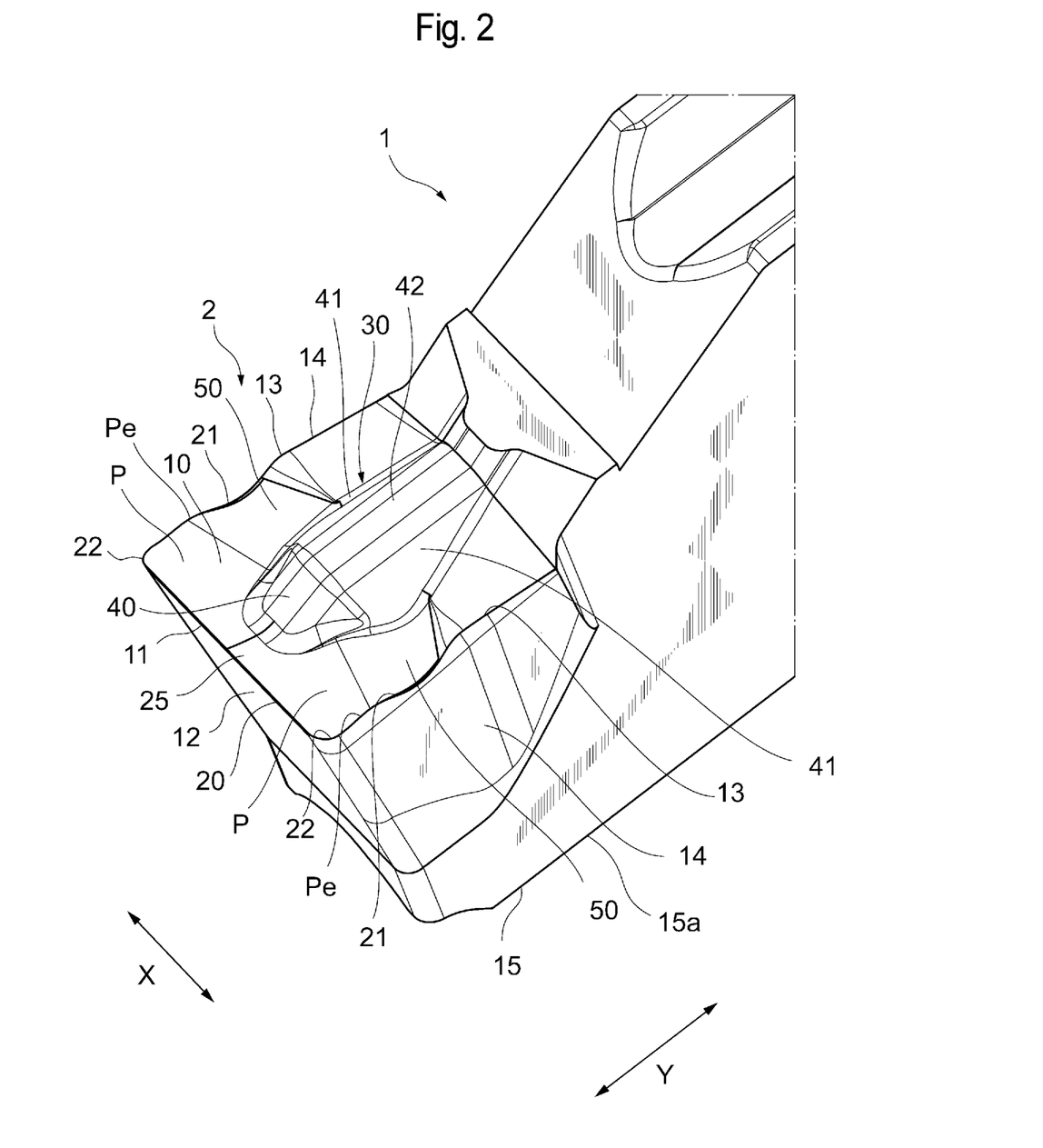
FIG. 2 is a perspective view of a tip end portion of the cutting insert.
Figure 3:
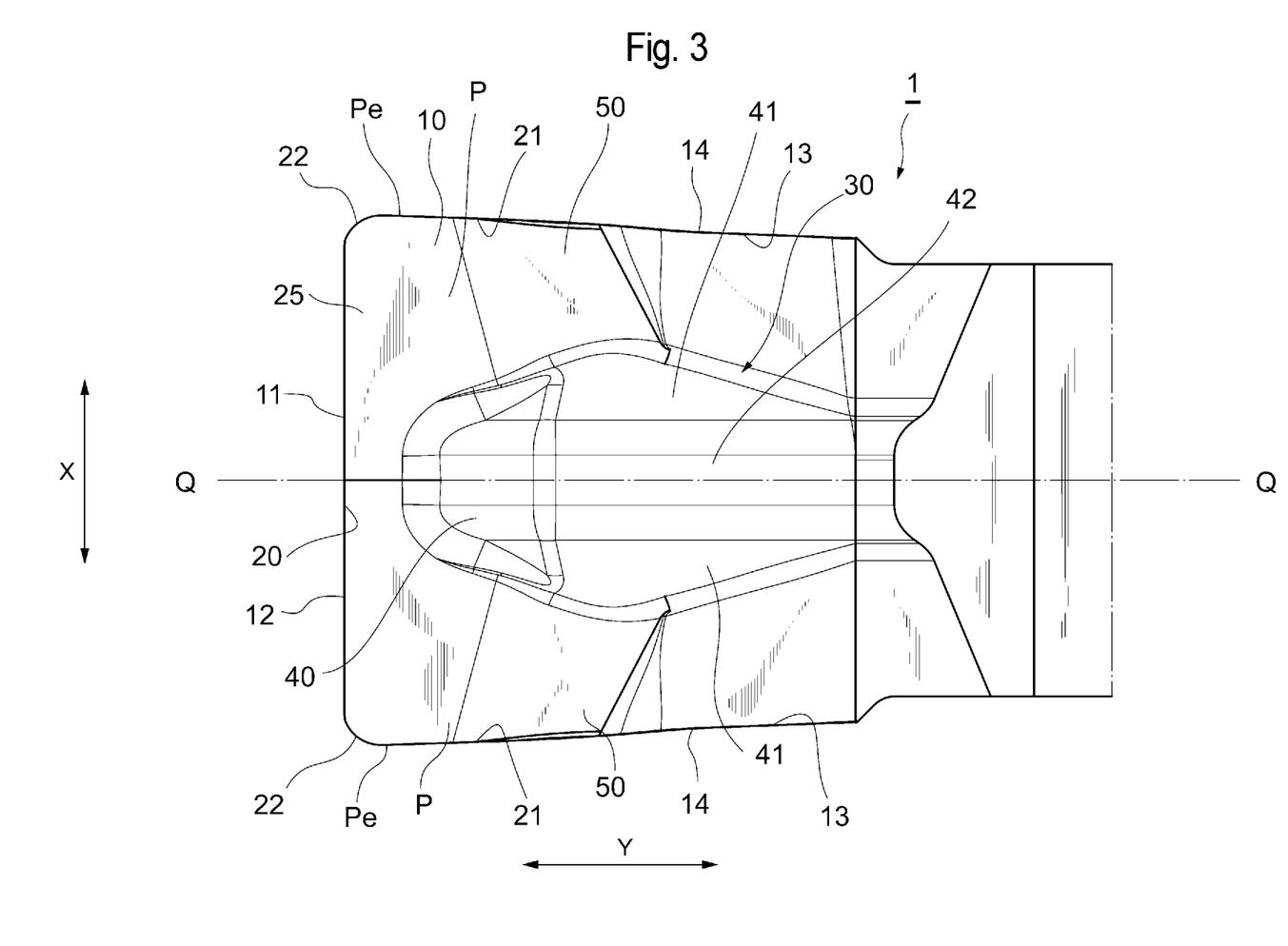
FIG. 3 is a top view of the tip end portion of the cutting insert.
Figure 4:
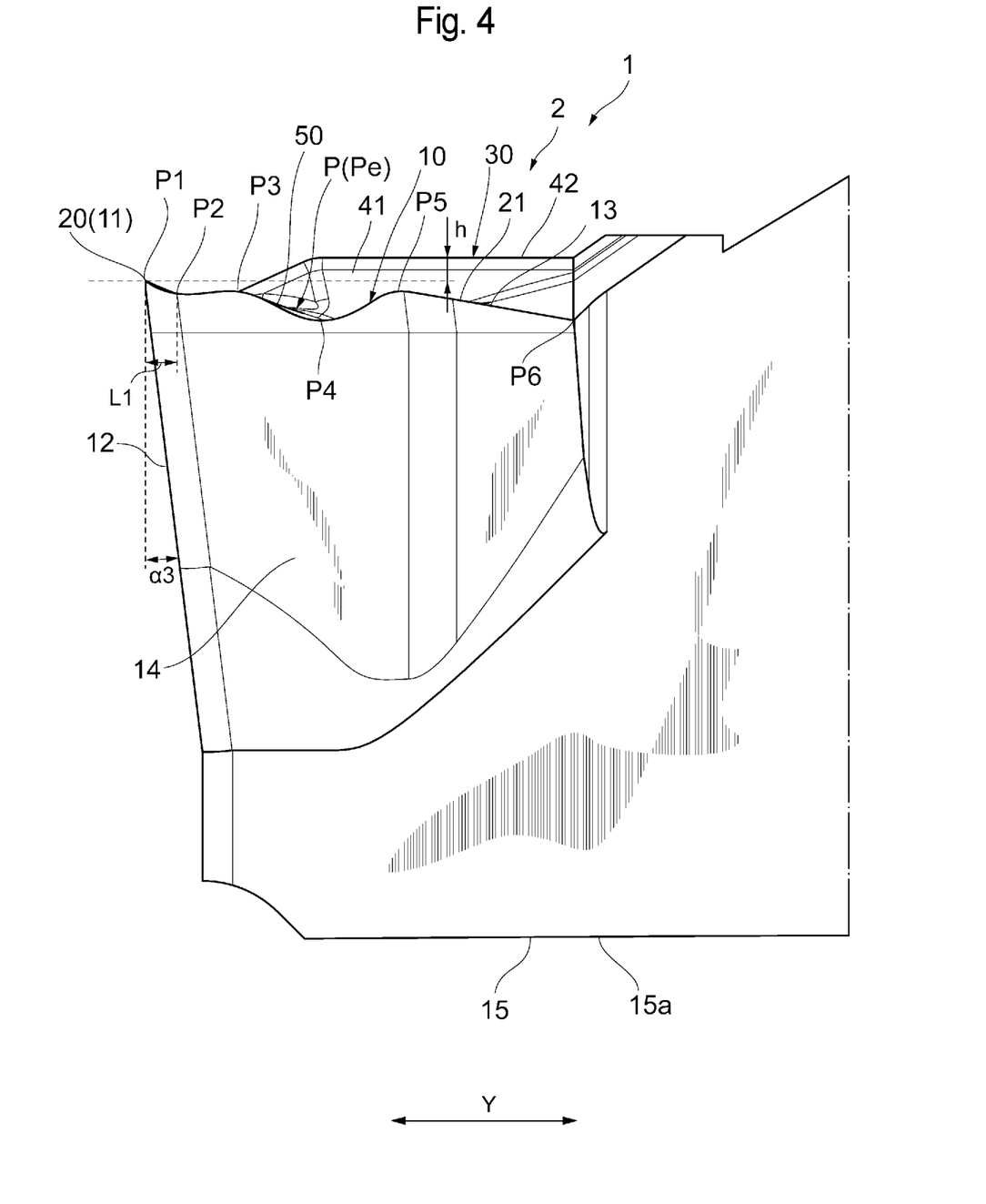
FIG. 4 is a side view of the tip end portion of the cutting insert.

FIG. 1 is a perspective view of a cutting insert 1 according to this embodiment, FIG. 2 is an enlarged view of a tip end portion of the cutting insert 1, FIG. 3 is a top view of the tip end portion of the cutting insert 1, and FIG. 4 is a side view of the tip end portion of the cutting insert 1.

The cutting insert 1 is suitable for grooving and cross feeding. As shown in FIG. 1, the cutting insert 1 is formed in an elongated, substantially rectangular parallelepiped shape, and includes a tip end portion 2 on each end thereof. As shown in FIGS. 2 to 4, the tip end portions 2 of the cutting insert 1 are formed in a substantially rectangular parallelepiped shape. Each tip end portion 2 of the cutting insert 1 includes, for example, an upper face 10, a front face 12 that forms an intersecting ridgeline 11 with the upper face 10, two side faces 14 that are connected to the front face 12 and form intersecting ridgelines 13 with the upper face 10, and a lower face 15 that opposes the front face 12. The two side faces 14 oppose each other. The upper face 10, the front face 12, and the side faces 14 are each formed in a substantially rectangular shape. The front face 12 is positioned on an end face of the tip end portion 2 in a longitudinal direction (a front face direction Y), and the side faces 14 are positioned on the two outer faces of the tip end portion 2 in a lateral direction X.

Note that in this specification, the upper face 10 of the tip end portion of the cutting insert 1 is the face that is oriented upward when the cutting insert 1 is in the attitude shown in FIG. 2 and the face that acts as a rake face during grooving and cross feeding. The front face 12 is the face that directly opposes a work material during grooving and is oriented in the feed direction during grooving, while the side faces 14 are the faces that are oriented in the feed direction during cross feeding. Further, a left-right direction heading toward the side faces 14, which is parallel to the intersecting ridgeline 11 of the front face 12, is set as the lateral direction X, and a front-rear direction heading toward the front face 12 at a right angle to the lateral direction X when seen from above is set as the front face direction Y. Further, a direction heading away from the front face 12 in the front face direction Y will be referred to as rearward. The lower face 15 has a contact portion that contacts a tool main body when the cutting insert 1 is fixed to the tool main body, and also includes a flat face 15a (shown in FIG. 5) on a lowermost portion thereof. In this specification, unless indicated otherwise, an attitude in which the flat face 15a of the lower face 15 is horizontal will be used as a reference attitude of the cutting insert 1.

Figure 5:
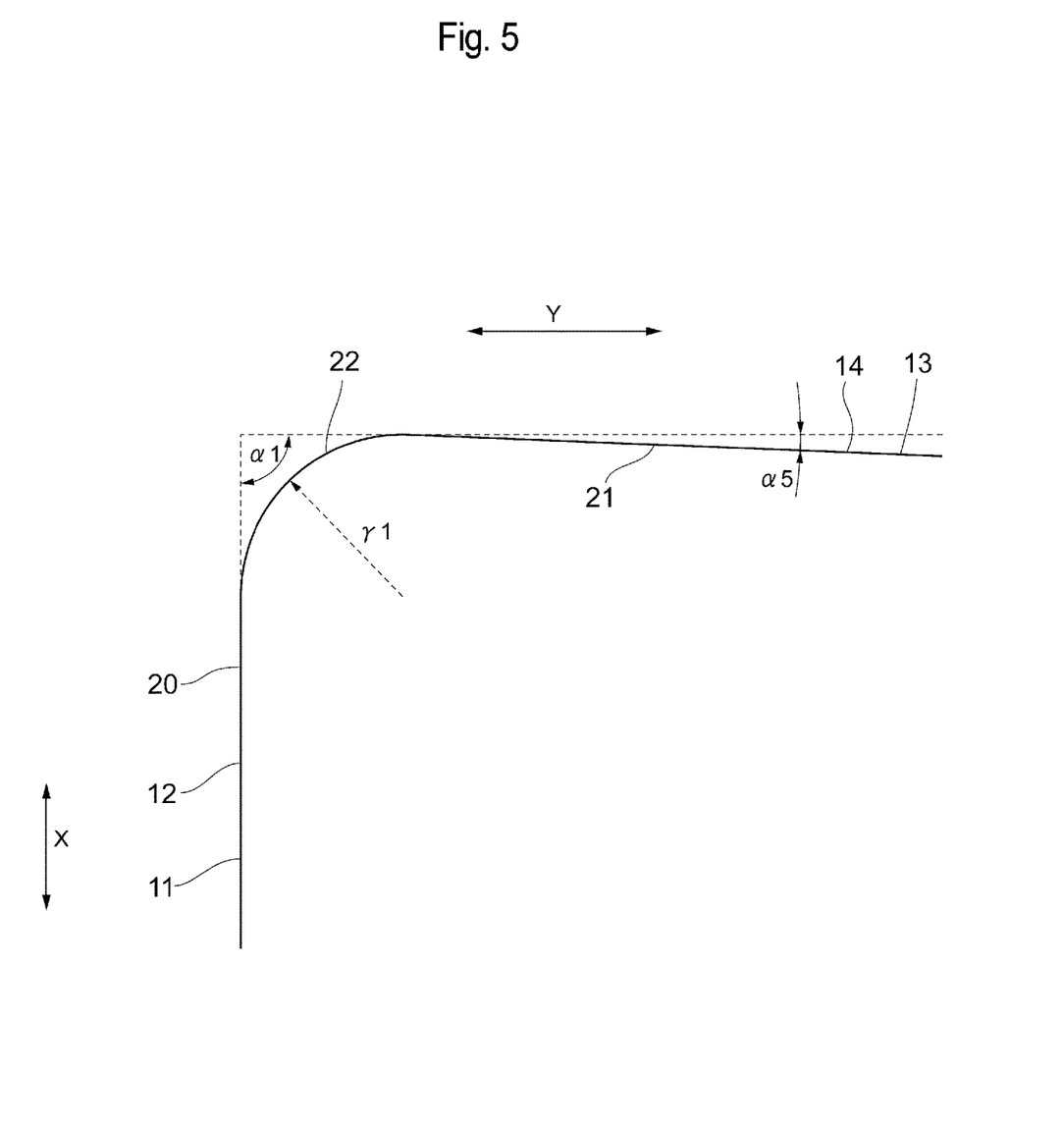
FIG. 5 is an enlarged view showing a corner part of the top view of the cutting insert.

The cutting insert 1 is formed in left-right symmetry in the lateral direction X relative to an imaginary perpendicular bisector Q that extends in the front face direction Y and passes through the center of the lateral direction X on the top view of FIG. 3. As shown in FIGS. 2 to 4, a front face cutting edge 20 used during grooving is provided on the intersecting ridgeline 11 between the upper face 10 and the front face 12. A side cutting edge 21 used during cross feeding is provided on each of the intersecting ridgelines 13 between the upper face 10 and the side faces 14. The front face cutting edge 20 and the side cutting edges 21 are connected by curved corners 22 that project outward when seen from above. As shown in FIG. 5, a curvature radius r1 of the corners 22 is set at approximately 0.1 to 0.3 mm, for example. The front face cutting edge 20 and the side cutting edges 21 intersect so as to form an inner angle α1 of no less than 85° and less than 90°, for example.

The front face cutting edge 20 is formed in a rectilinear shape on the top view shown in FIG. 3. The front face cutting edge 20 is also formed in a rectilinear shape on a front view shown in FIG. 6. As shown in FIGS. 2 to 4, the side cutting edge 21 has an undulating shape.

As shown in FIG. 2, an inclined face 25 that is connected to the front face cutting edge 20 and gradually decreases in height toward the rearward side from the front face cutting edge 20 is provided on a front end portion, in the front face direction Y, of the upper face 10. The inclined face 25 is formed over the entire lateral direction X of the upper face 10. A projection-shaped first upper face portion (a chip breaker portion) 30 is provided on the upper face 10 in the center of the lateral direction X. The first upper face portion 30 is formed as a ridge extending in the front face direction Y. The first upper face portion 30 is formed in a substantially trapezoidal shape when seen from the front.

The first upper face portion 30 includes, for example, a front face portion 40, side face portions 41, and an upper face portion 42. The front face portion 40 is provided in a position a predetermined distance away from the front face cutting edge 20 toward the rearward side and includes an inclined face that gradually increases in height toward the rearward side. The front face portion 40 is connected to the inclined face 25.

The side face portions 41 are provided in positions a predetermined distance away from the side cutting edges 21 on the side edges of the upper face 10 toward the center side of the lateral direction X and respectively include inclined faces that gradually increase in height toward the center side of the lateral direction X. The upper face portion 42 is formed in an upwardly projecting arc shape. A front face side thereof is connected to the front face portion 40, and side face sides thereof are respectively connected to the side face portions 41. When seen from the side, as shown in FIG. 4, the height of the first upper face portion 30 is greater than the height of the front face cutting edge 20. A height difference h between the first upper face portion 30 and the front face cutting edge 20 is preferably not more than 0.5 mm. Note that when the height difference h exceeds 0.5 mm, the action of the first upper face portion 30 becomes too strong, leading to a relative reduction in the strength of the action of an undulating upper face portion 50.

As shown in FIGS. 2 to 4, the undulating upper face portion 50 is provided on the upper face 10 on each side of the first upper face portion 30 in the lateral direction X. The undulating upper face portion 50 has an undulating shape P in which peaks and troughs are formed continuously rearward from the front face cutting edge 20 side. An undulating shape Pe that serves as an edge portion of the undulating shape P when seen from the side is formed on each of the side cutting edges 21 of the undulating upper face portion 50. Note that the term "undulating shape" denotes a shape having at least one peak and one trough connected thereto.

As shown in FIG. 4, the undulating shape P of the undulating upper face portion 50 (the undulating shape Pe of the side cutting edge 21) is formed to extend toward the rearward side in the front face direction Y from the front face cutting edge 20, using the front face cutting edge 20 as a start point. The undulating shape P of the undulating upper face portion 50 has three undulations, for example, and therefore includes a first peak P1, a first trough P2, a second peak P3, a second trough P4, a third peak P5, and a third trough P6 in that order from the start point on the front face cutting edge 20 side toward the rearward side. When seen from the side, the first trough P2 of the undulating shape Pe on the side cutting edge 21 decreases in height from the start point of the side cutting edge 21, and a distance L1 from the front face cutting edge 20 to the lowermost portion of the first trough P2 is set at not more than 3 mm.

Figure 7:
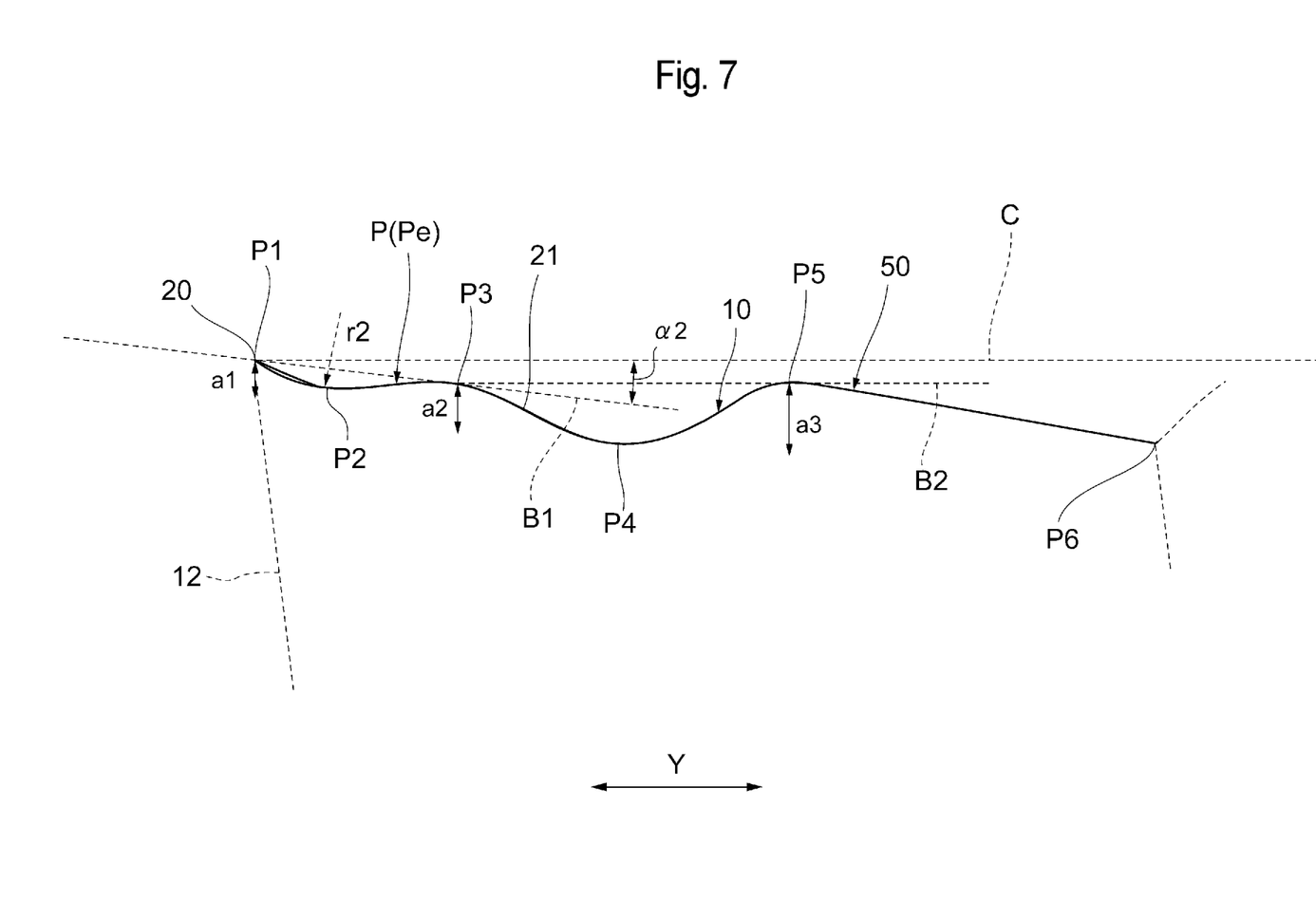
FIG. 7 is a pattern diagram showing an example of an undulating shape of an undulating upper face portion.

As shown in FIG. 7, for example, respective amplitudes a1, a2, a3 of the three undulations on the undulating shape P (the undulating shape Pe) gradually increase away from the front face cutting edge 20. A curvature radius r2 of the curved portions of the peaks and troughs forming the undulating shape Pe of the side cutting edge 21 is set at not more than 8 mm, for example.

On the undulating shape P (the undulating shape Pe) of the undulating upper face portion 50, the positions of the peaks and troughs, when seen from the side, gradually decrease in height away from the front face cutting edge 20. A reference line B1 linking the adjacent peaks P1 and P3 and a reference line B2 linking the adjacent peaks P3 and P5 have an angle of incline α2 of approximately 1 to 10°, for example approximately 3°, relative to a flat surface C of the lower face 15, for example.

Figure 8:
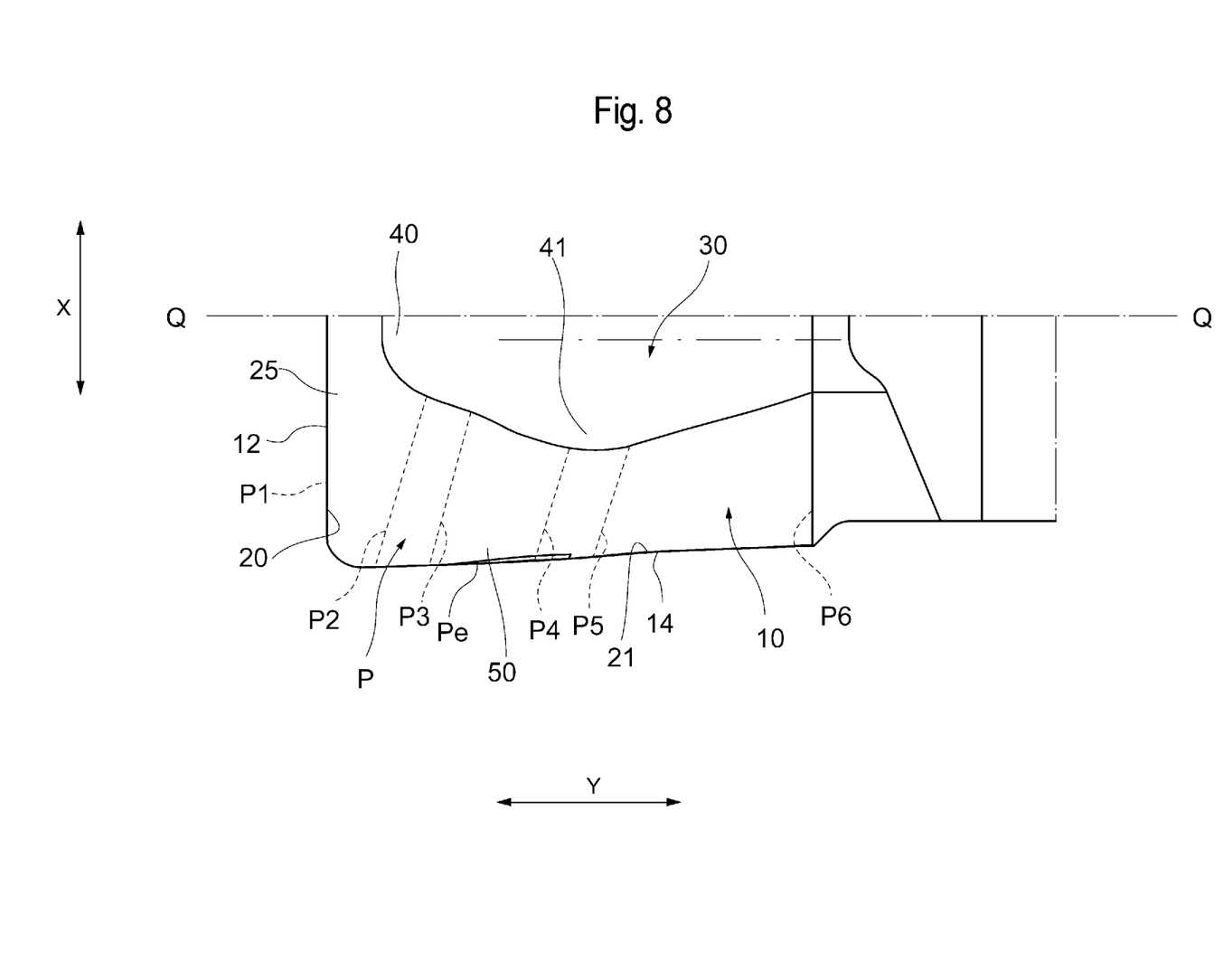
FIG. 8 is a top view showing positions of peaks and troughs forming the undulating shape of the undulating upper face portion.
Figure 9:
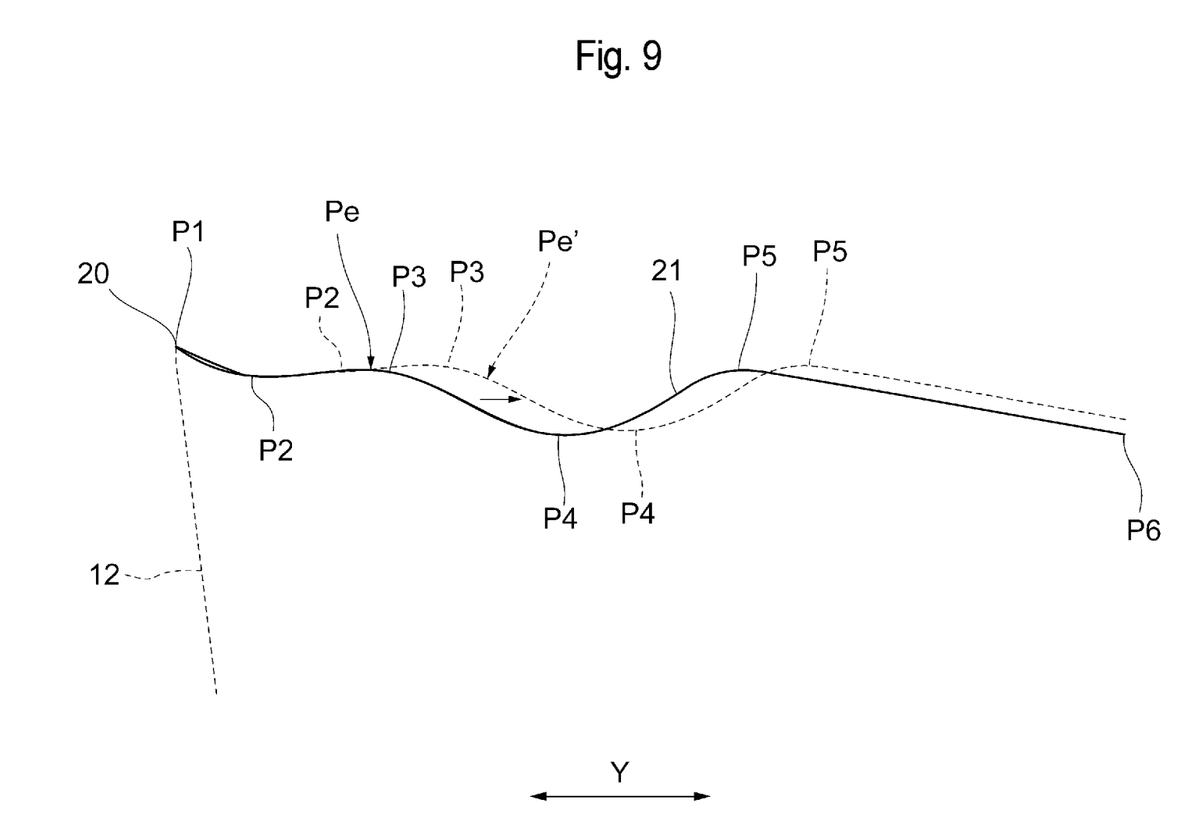
FIG. 9 is a pattern diagram showing an undulating shape obtained by projecting an undulating shape on a side cutting edge of the undulating upper face portion and an undulating shape on a side face portion of a first upper face portion onto an imaginary perpendicular bisector 0.

As shown in FIGS. 2, 3, and 8, the undulating upper face portion 50 is formed such that some of the peaks and troughs of the undulating shape P advance gradually toward the rear of the front face cutting edge 20 (in a diagonal direction) from the side cutting edge 21 toward the center side of the lateral direction X and are connected to the side face portion 41 of the first upper face portion 30. Note that in FIG. 8, examples of ridgelines of the respective peaks and troughs of the undulating shape P are indicated by dotted lines. For example, the first trough P2, the second peak P3, the second trough P4, and the third peak P5 (i.e. the parts other than the first peak P1 and the third trough P6) of the undulating shape P extend diagonally from the side cutting edge 21 toward the first upper face portion 30. As shown in FIG. 9, for example, when the first trough P2, the second peak P3, the second trough P4, and the third peak P5 (i.e. the parts other than the first peak P1 and the third trough P6) of the undulating shape Pe of the side cutting edge 21 when seen from the side and the first trough P2, the second peak P3, the second trough P4, and the third peak P5 (i.e. the parts other than the first peak P1 and the third trough P6) of an undulating shape Pe' that is connected to the first upper face portion 30 when seen from the side are both projected onto the imaginary perpendicular bisector Q that extends in the front face direction Y and passes through the center of the lateral direction X of the front face cutting edge 20 on the top view of FIG. 3, the undulating shape Pe' is obtained by shifting the undulating shape Pe in parallel by a predetermined distance, for example at least 0.3 mm, in a direction heading away from the front face cutting edge 20.

As shown in FIG. 8, the second peak P3 of the undulating shape P of the undulating upper face portion 50 is connected to the side face portion 41 further toward the rearward side than the front face portion 40 of the first upper face portion 30. The first peak P1 extends along the front face cutting edge 20 in the lateral direction X, and the apex thereof serves as the front face cutting edge 20.

As shown in FIG. 4, the front face 12, when seen from the side, has a clearance angle during grooving, or more specifically a clearance angle α3 that is obtained by retracting the lower face 15 side of the front face 12 toward the rearward side in the front face direction Y relative to a perpendicular direction to the lower face 15. The clearance angle α3 is set to be larger than 0°, for example, and for example is set at approximately 7°.

Figure 6:
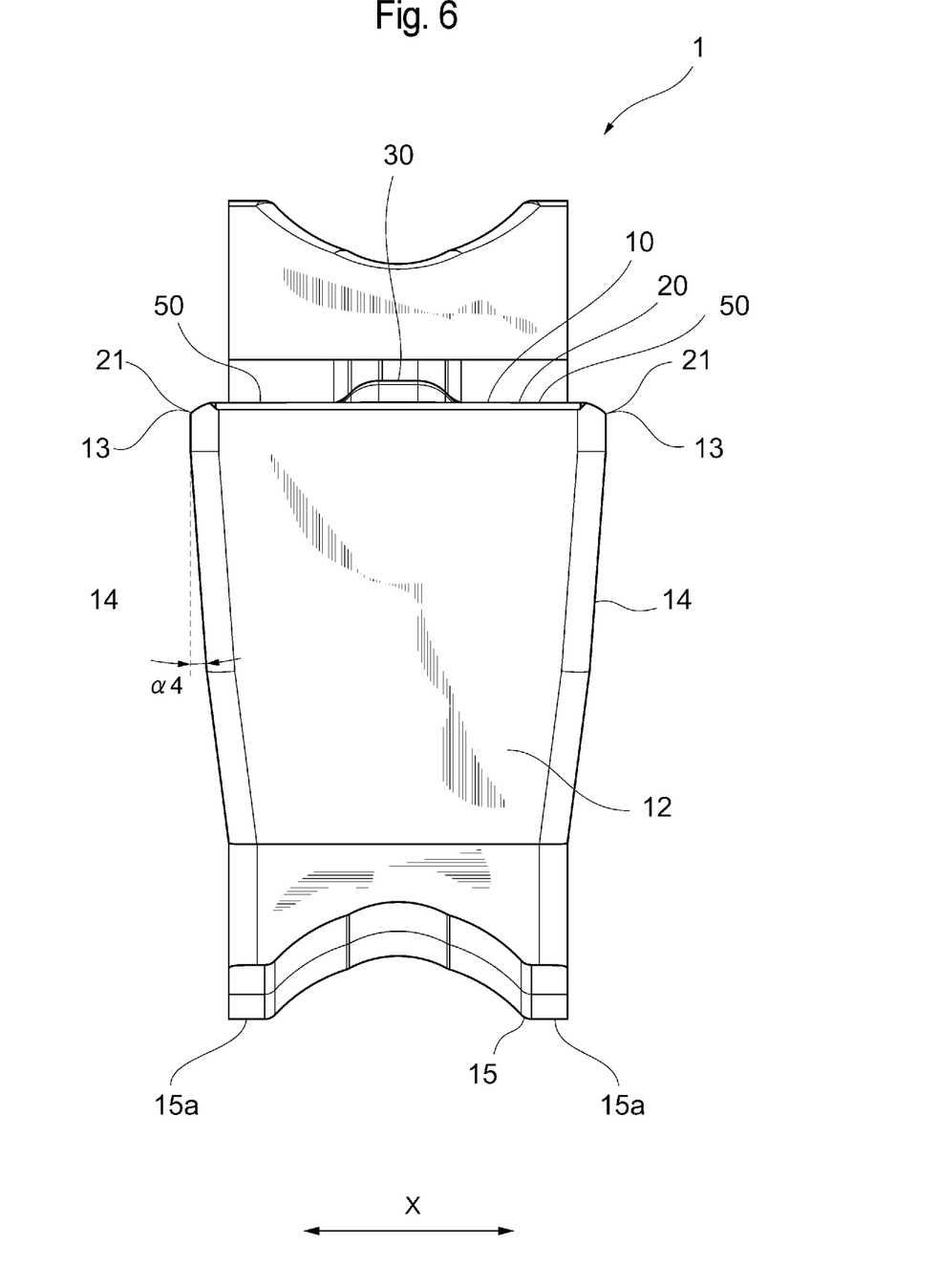
FIG. 6 is a front view of the tip end portion of the cutting insert.

As shown in FIG. 6, the side face 14, when seen from the front, has a clearance angle during cross feeding, or more specifically a clearance angle α4 that is obtained by retracting the lower face 15 side of the side face 14 toward the center side in the lateral direction X relative to a perpendicular direction to the lower face 15. The clearance angle α4 is set to be larger than 0°, for example, and for example is set at approximately 7°.

As shown in FIG. 5, the side face 14, when seen from above, has a clearance angle α5 (a back taper) that is larger than 0°, for example, but no larger than 5°, for example, relative to the front face 12.

Figure 10:
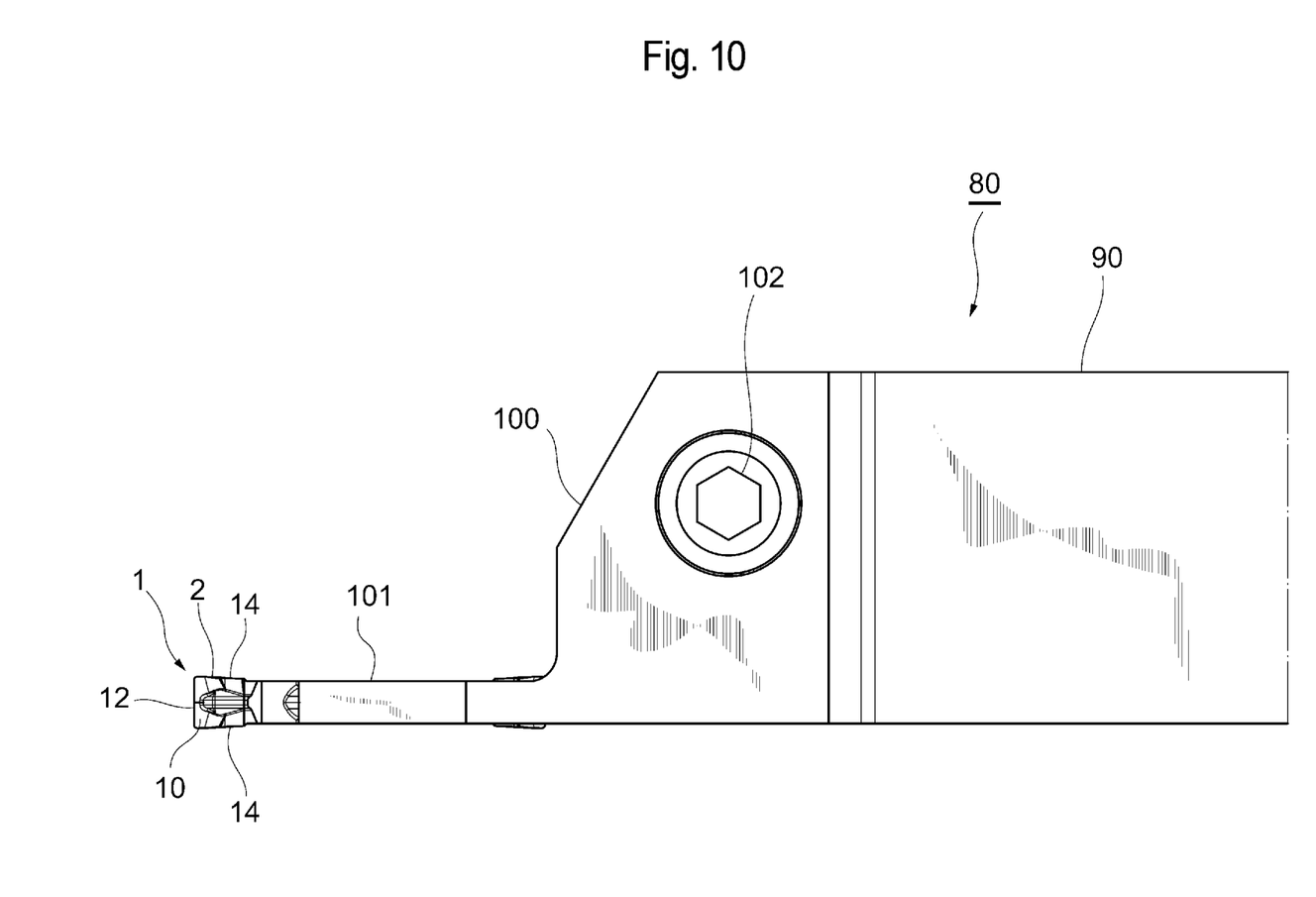
FIG. 10 is an illustrative view of a cutting tool.

Next, a cutting tool 80 that includes the above cutting insert 1 will be described. The cutting tool 80 shown in FIG. 10 is a replaceable cutting edge-type turning tool, and the cutting tool 80 includes a tool main body 90 and the cutting insert 1. The tool main body 90 is formed in a long, substantially rectangular parallelepiped shape, for example. A fixing portion 100 for gripping and fixing the cutting insert 1 is provided on a tip end portion of the tool main body 90. The fixing portion 100 is provided with a gripping portion 101 for gripping the cutting insert 1 from above and below, and a fixing screw 102 for tightening the gripping portion 101. For example, by gripping the cutting insert 1 with the gripping portion 101 and tightening the gripping portion 101 with the fixing screw 102, the cutting insert 1 can be fixed to the cutting tool main body 90. The cutting insert 1 is mounted with the front face 12 facing the tip end side of the cutting tool 80.

Figure 11:
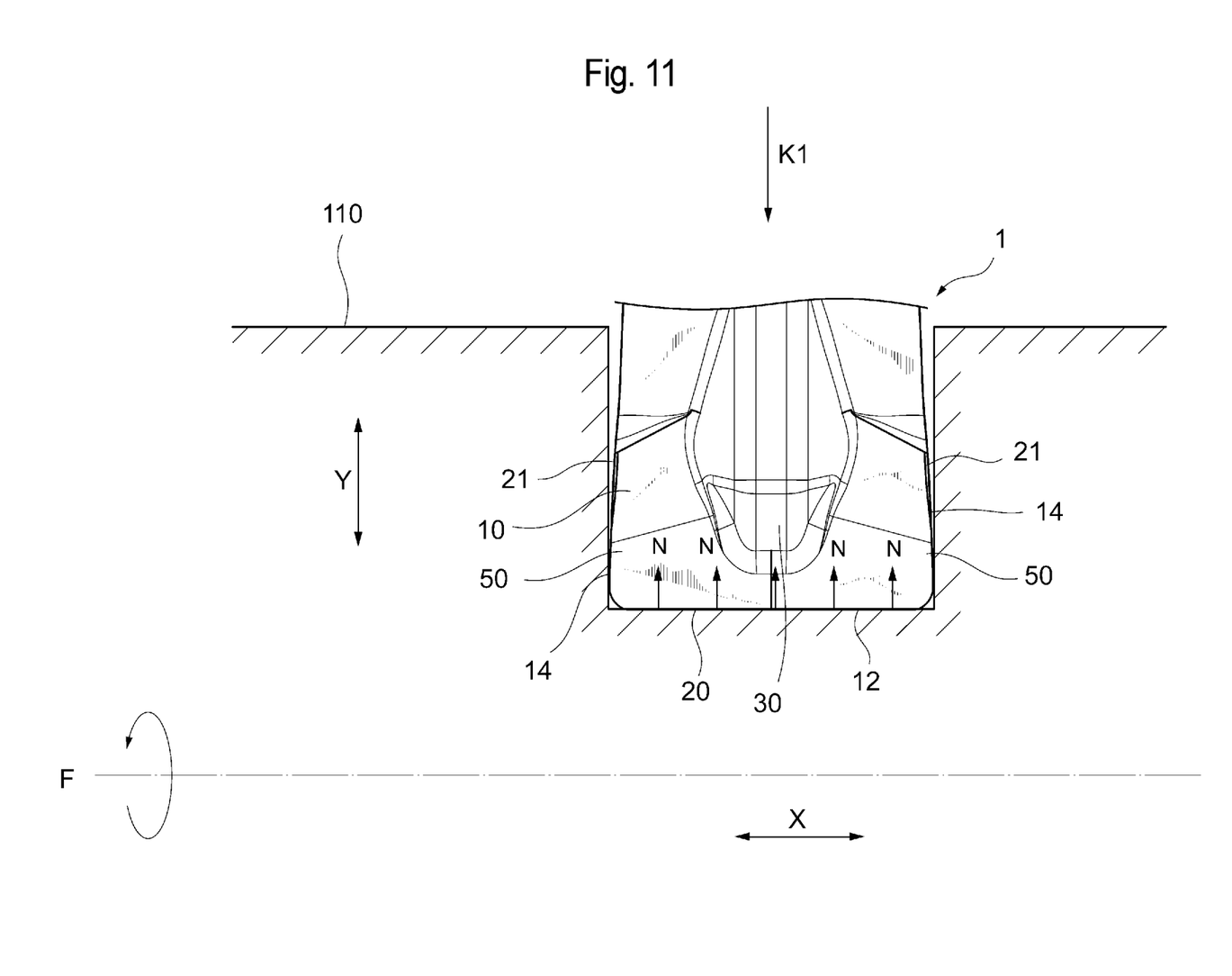
FIG. 11 is an illustrative view illustrating grooving.

The cutting tool 80 is used while attached to a lathe, for example. As shown in FIG. 11, grooving is performed by causing the front face 12 of the cutting insert 1 to directly oppose a work material 110 rotating about a rotary axis F and moving the cutting insert 1 toward the work material 110 in a grooving direction K1, which is a right angle direction relative to the rotary axis F, for example. At this time, as indicated by arrows in FIG. 11, chips N released from the work material 110 by the front face cutting edge 20 are released in the rearward direction of the front face direction Y of the upper face 10, whereupon the chips mount the first upper face portion 30 and are cut thereby.

Figure 12:
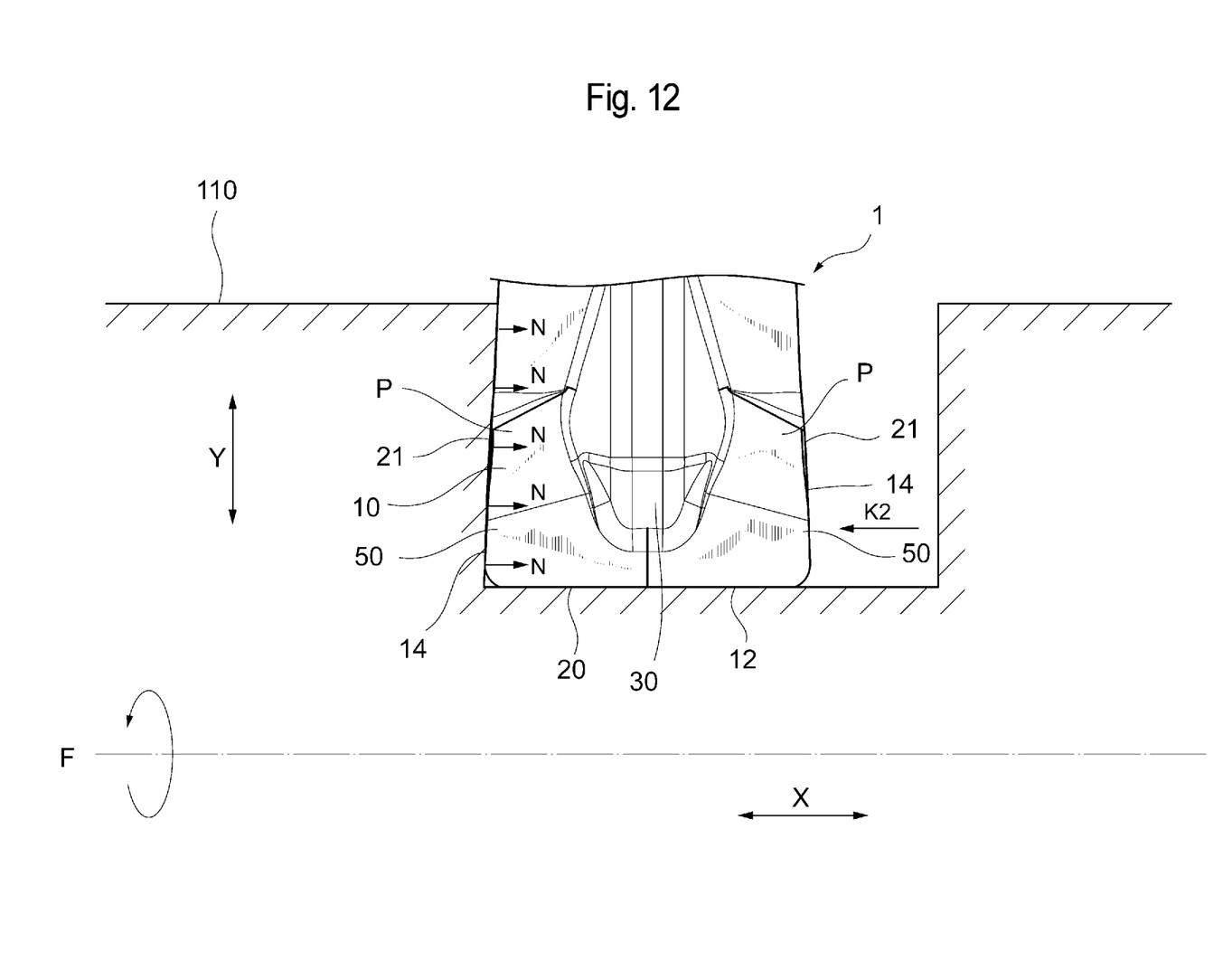
FIG. 12 is an illustrative view illustrating cross feeding.

Next, as shown in FIG. 12, cross feeding is performed by moving the cutting insert 1 along the rotary axis F of the work material 110 in a cross feeding direction K2. At this time, as indicated by arrows in FIG. 12, the chips N released from the work material 110 by the side cutting edge 21 are released in a diagonal direction inclined by a predetermined angle toward the rearward side of the front face direction Y from the lateral direction X of the upper face 10, and the shape thereof is prescribed by the undulating upper face portion 50. In other words, the chips released during cross feeding impinge on the undulating shape P of the undulating upper face portion 50 and are formed in a stable shape due to the effect of the undulating shape P.

According to this embodiment, the upper face 10 of the cutting insert 1 includes the undulating upper face portion 50 on which peaks and troughs are formed continuously in a direction heading away from the front face cutting edge 20, and the undulating upper face portion 50 is configured such that the side cutting edge 21 has a continuous undulating shape from the front face cutting edge 20. Thus, the shape of the chips released during grooving is controlled by the first upper face portion 30, and the shape of the chips released during cross feeding is controlled by the undulating upper face portion 50. As a result, the undulating upper face portion 50 can improve chip control during cross feeding while the first upper face portion 30 improves chip control during grooving. Hence, a cutting insert 1 that exhibits superior chip control during both grooving and cross feeding can be realized. Moreover, with the undulating shape Pe of the side cutting edge 21, cutting resistance during cross feeding can be reduced. Furthermore, during grooving and cross feeding, the undulating upper face portion 50 and the first upper face portion 30 cooperate, and due to the synergy therebetween, chip control can be further improved.

The undulating upper face portion 50 is configured such that some of the peaks and troughs of the undulating shape P thereof advance gradually in a direction heading away from the front face cutting edge 20 from the side cutting edge 21 toward the first upper face portion 30 in the lateral direction X. Thus, the chips released during cross feeding reliably impinge on the peaks and troughs of the undulating shape P of the undulating upper face portion 50, and therefore the shape of the chips released during cross feeding can be controlled more easily. As a result, chip control during cross feeding can be improved even further. Moreover, the chips released during cross feeding receive force in a direction heading away from the bottom of the groove in the work material 110 and can therefore be prevented from colliding with and damaging the bottom of the groove.

The undulating upper face portion 50 is configured such that the undulating shape P is partially connected to the side face portion 41 of the first upper face portion 30. Thus, a sufficient region for controlling the shape of the chips released during cross feeding can be secured. Further, the chips released during cross feeding can be cut by the first upper face portion 30, and as a result of the synergy produced when the undulating upper face portion 50 and the first upper face portion 30 cooperate during cross feeding in this manner, a further improvement in chip control can be achieved.

The undulating shape P includes the first peak P1, the first trough P2, the second peak P3, and the second trough P4 in that order in the direction heading away from the front face cutting edge 20, using the front face cutting edge 20 as the start point. The first peak P1 is formed along the front face cutting edge 20, and the second peak P3 is connected to the side face portion 41 rearward of the front face portion 40 of the first upper face portion 30. Thus, with the undulating shape P of the undulating upper face portion 50, the action of the first upper face portion 30 during grooving can be improved even further.

The undulating upper face portion 50 is configured such that the undulating shape Pe of the side cutting edge 21, when seen from the side, includes the first trough P2 that decreases in height from the front face cutting edge 20, using the front face cutting edge 20 as the start point. Thus, the chips that are initially released during cross feeding reliably impinge on the peaks and troughs of the undulating shape P of the undulating upper face portion 50, and as a result, the shape of the chips can be stabilized even further.

The distance from the start point of the side cutting edge 21 to the lowermost portion of the first trough P2 when seen from the side is not more than 3 mm. Thus, the chips that are initially released during cross feeding immediately impinge on the undulating shape P of the undulating upper face portion 50, and as a result, the shape of the chips can be stabilized even further.

The undulating upper face portion 50 is configured such that the amplitude of the undulating shape Pe of the side cutting edge 21 gradually increases away from the front face cutting edge 20. Therefore, the relative strength of the side cutting edge 21 on the front face cutting edge 20 side, on which cutting resistance is greater, can be increased. As a result, sufficient stability can be secured in the shape of the chips using the undulating shape P while securing an appropriate level of strength corresponding to the cutting resistance on the side cutting edge 21.

The curvature radius r2 of the curved portions of the undulating shape Pe on the side cutting edge 21, when seen from the side, is not more than 8 mm, and therefore the peaks and troughs of the undulating shape P can be formed at a short period. As a result, sufficient stability can be secured in the shape of the chips released during cross feeding.

The front face cutting edge 20 has a rectilinear shape when seen from above, and therefore a groove with a flat bottom can be formed in the work material 110 during grooving. The front face cutting edge 20 also has a rectilinear shape when seen from the front, and therefore the bottom of the groove in the work material 110 can be formed to be even flatter.

The first upper face portion 30 is formed as a ridge extending in the front face direction Y, and therefore chip control during grooving and chip control during cross feeding can both be realized favorably.

A preferred embodiment of the present invention was described above with reference to the figures, but the present invention is not limited to this example, and a person skilled in the art would obviously be able to conceive of various modified and amended examples within the scope of the claims. Needless to mention, these examples are also understood to belong to the technical scope of the present invention.

Figure 13:
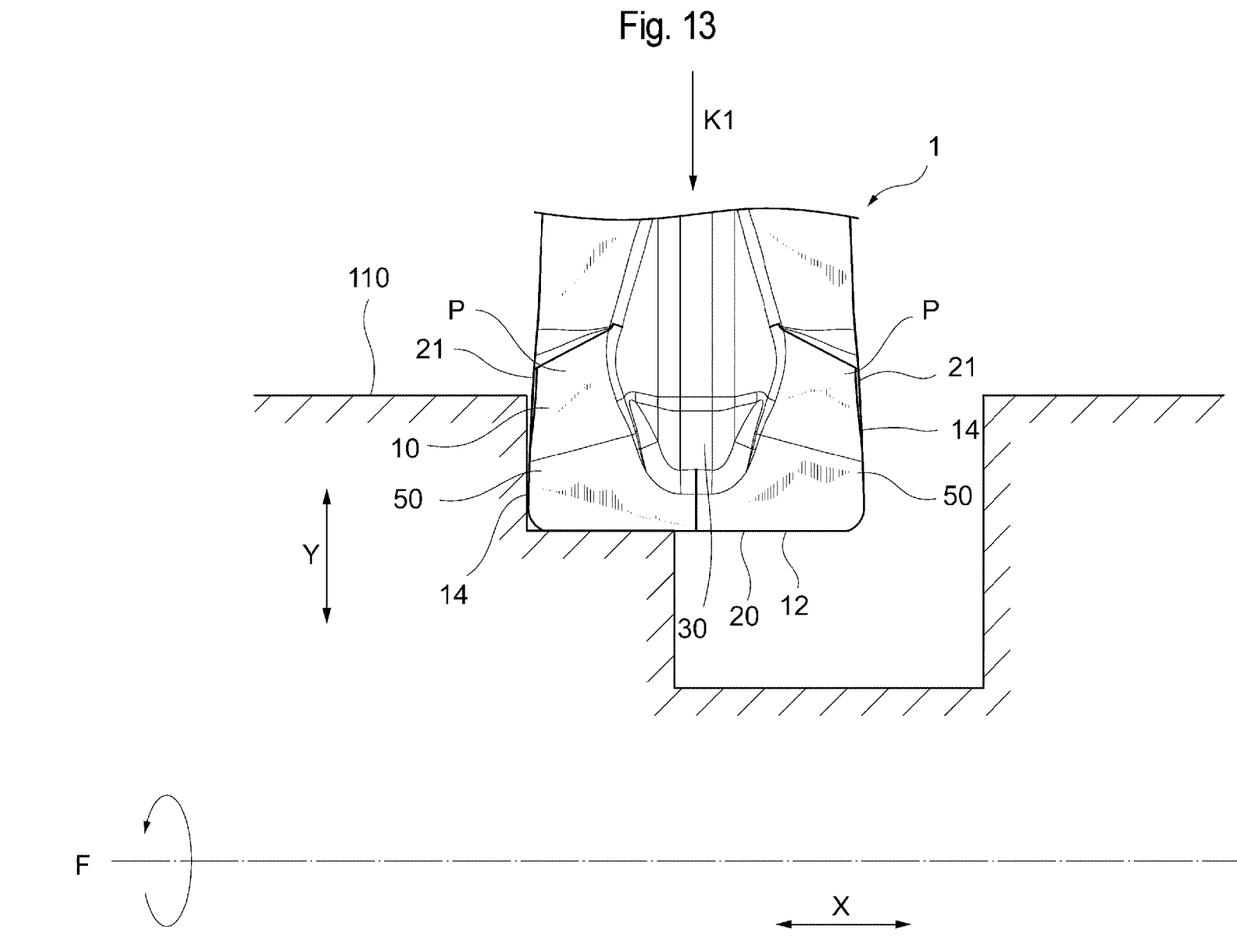
FIG. 13 is an illustrative view illustrating shoulder shaving.

As shown in FIG. 13, the cutting insert 1 described in the above embodiment may be used for so-called shoulder shaving, in which a groove is extended using only the left-right direction ends of the front face cutting edge 20 rather than the entire front face cutting edge 20. In this case, the cutting resistance that occurs during the so-called shoulder shaving can be greatly reduced by the undulating shape P of the undulating upper face portion 50.

The overall shape and so on of the cutting insert 1 are not limited to the above embodiment. The first upper face portion 30 may take a shape other than a ridge. For example, the first upper face portion 30 may be groove-shaped. The undulating upper face portion 50 is provided on both sides of the first upper face portion 30 but may be provided on one side. The undulating shape P of the undulating upper face portion 50 does not necessarily have to take the shape of a sine wave and may take another undulating shape in which peaks and troughs are formed repeatedly. For example, the undulating shape P may be formed from continuous semi-circular arcs. The number, period, and amplitude of the undulations forming the undulating shape P are also not limited to the above embodiment.

The present invention is useful when providing a cutting insert and a cutting tool that exhibit superior chip control during both grooving and cross feeding.

What is claimed is:

1. A cutting insert having a substantially rectangular parallelepiped-shaped tip end portion, the tip end portion comprising:
    an upper face;
    a front face that is positioned on a longitudinal direction end face of the tip end portion and forms an intersecting ridgeline with the upper face;
    a side face that is connected to the front face and forms an intersecting ridgeline with the upper face;
    a lower face that is connected to the front face and the side face and is opposite to the upper face;
    a front face cutting edge provided on the intersecting ridgeline between the upper face and the front face; and
    a side cutting edge provided on the intersecting ridgeline between the upper face and the side face, wherein
    the upper face includes:
    a projection-shaped or groove-shaped first upper face portion; and
    an undulating upper face portion on which peaks and troughs are formed continuously in a direction heading away from the front face cutting edge, the undulating upper face portion being provided on at least one lateral direction side of the first upper face portion,
    the undulating upper face portion is configured such that the side cutting edge, when seen from the side, has a continuous undulating shape from the front face cutting edge,
    the undulating upper face portion is configured such that, in a top view, the continuous undulating shape extends from the side cutting edge to the first upper face portion, and at least some of the peaks and troughs of the undulating shape advance in a diagonal direction heading away from the front face cutting edge starting proximal the side cutting edge and extending toward the first upper face portion such that an outer end portion of each of the at least some of the peaks and troughs proximal the side cutting edge is closer to the front face cutting edge than a respective inner end portion of each of the at least some of the peaks and troughs proximal the first upper face portion,
    the undulating upper face portion is configured such that the undulating shape is at least partially connected to a side face portion of the first upper face portion,
    the undulating upper face portion is configured such that positions of upper edges of successive ones of each of the peaks decrease in height heading away from the front face cutting edge such that a reference line linking the upper edges of adjacent ones of the peaks inclines from the front face cutting edge toward a flat surface of the lower face,
    the undulating shape includes at least a first peak, a first trough, a second peak, and a second trough in that order in the diagonal direction heading away from the front face cutting edge, using the front face cutting edge as a start point,
    the first peak is formed along the front face cutting edge, and
    the second peak is connected to the side face portion further in the diagonal direction heading away from the front face cutting edge than a front face portion on a front face side of the first upper face portion.

2. The cutting insert according to claim 1, wherein the undulating upper face portion is configured such that the undulating shape of the side cutting edge, when seen from the side, includes a trough that decreases in height from the front face cutting edge, using the front face cutting edge as a start point.

3. The cutting insert according to claim 2, wherein a distance from a start point of the side cutting edge to a lowermost portion of the trough when seen from the side is not more than 3 mm.

4. The cutting insert according to claim 1, wherein the undulating upper face portion is configured such that an amplitude of the undulating shape of the side cutting edge gradually increases away from the front face cutting edge.

5. The cutting insert according to claim 1, wherein a curvature radius of a curved portion of the undulating shape of the side cutting edge, when seen from the side, is not more than 8 mm.

6. The cutting insert according to claim 1, wherein the front face cutting edge has a rectilinear shape when seen from above.

7. The cutting insert according to claim 1, wherein the first upper face portion is formed as a ridge extending in a front face direction toward the front face.

8. The cutting insert according to claim 1, wherein the undulating upper face portion is provided on both lateral direction sides of the first upper face portion.

9. A cutting tool comprising the cutting insert according to claim 1.

* * * * *